Nov. 21, 1967        A. MAITLAND        3,354,328

MAGNETOHYDRODYNAMIC APPARATUS

Filed Sept. 25, 1963        2 Sheets-Sheet 1

INVENTOR
ARTHUR MAITLAND

BY *Larson and Taylor*

ATTORNEYS

United States Patent Office 3,354,328
Patented Nov. 21, 1967

3,354,328
MAGNETOHYDRODYNAMIC APPARATUS
Arthur Maitland, Newcastle, England, assignor to C. A. Parson & Company, Limited, Newcastle, England
Filed Sept. 25, 1963, Ser. No. 311,939
9 Claims. (Cl. 310—11)

This invention relates to means for the direct generation of electricity by driving an electrically conducting gas through a magnetic field transverse to the direction of gas flow, the process using this principle of electricity generation being commonly known as a magneto-hydro-dynamic or a magneto-plasma-dynamic process.

Hitherto ionization of the gas to make it electrically conducting has been achieved by heating the gas to temperatures at which sufficient thermal ionization occurs. By seeding the gas with an alkali metal vapor such as caesium or potassium, the necessary degree of conductivity can be achieved in the temperature region 2000°–3000° C. if it is produced by equilibrium thermal ionization.

Difficulties are associated with the construction of generators for operation at these high temperatures and the principal object of the present invention is to provide apparatus or plant of the above kind in which the temperature of operation may be reduced or alternatively the plant may be operated at the temperatures mentioned with improved efficiency.

The invention consists in means for the direct generation of electricity in which an inert gas seeded with an alkali metal vapor is driven in a closed cycle through a magnetic field transverse to the direction of gas flow in which means at least part of the ionization of the gas is achieved by photo-ionizing the gas.

This invention also consists in means in accordance with the preceding paragraph in which the gas is thermally and photo-ionized.

The invention also consists in means for the direct generation of electricity substantially as described below with reference to the accompanying diagrammatic drawings which shows generating means in accordance with one embodiment of the present invention.

Figure 1:
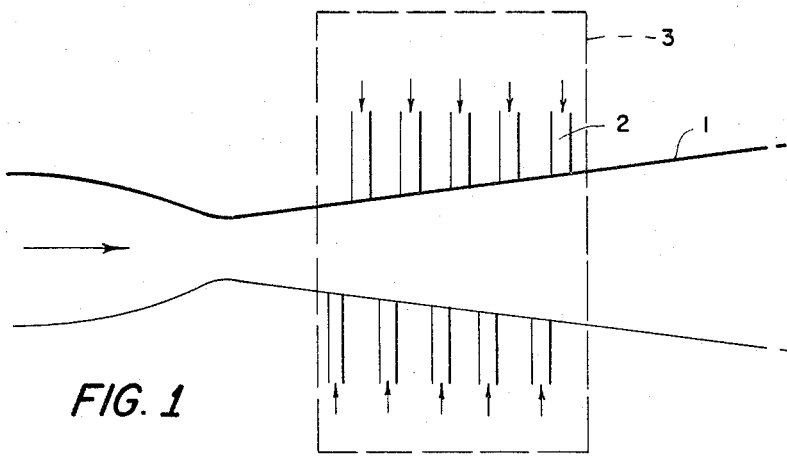
FIGURE 1 shows a nozzle of magneto-hydro-dynamic apparatus in accordance with one embodiment of the invention.

In the drawing wherein like numbers refer to like parts, a magneto-plasma-dynamic generator comprises a duct or nozzle 1 through which is driven an inert gas, such as helium, seeded with an alkali metal vapor such as that of caesium. The gas circulates in a closed cycle and is heated in a heat exchanger prior to entering the nozzle. To boost the ionization of the gas produced by heating, light beams 2 are directed into the nozzle to photo-ionize the gas at any chosen region of the gas flow through the nozzle.

The light beams should preferably have a wavelength shorter than that corresponding to the ionization potential of the seeding element (caesium, rubidium, potassium, sodium, barium and other alkali metals and metals in the alkaline earth group), and may be produced by mercury or carbon arcs, high pressure plasma jets or by means of a laser.

In the form illustrated the light beams are directed at the part of the nozzle located in magnetic field region 3 and may be on opposite sides of the nozzle with the beams on one side staggered in relation to those on the other side as shown.

The beams may operate continuously or may be operated in pulses to produce striations of ionization and can be made the basis of power generation of alternating current.

Windows formed in the nozzle or generator duct to permit the light beams to enter the gas stream may, for example, be made of sapphire or quartz.

Figure 2:
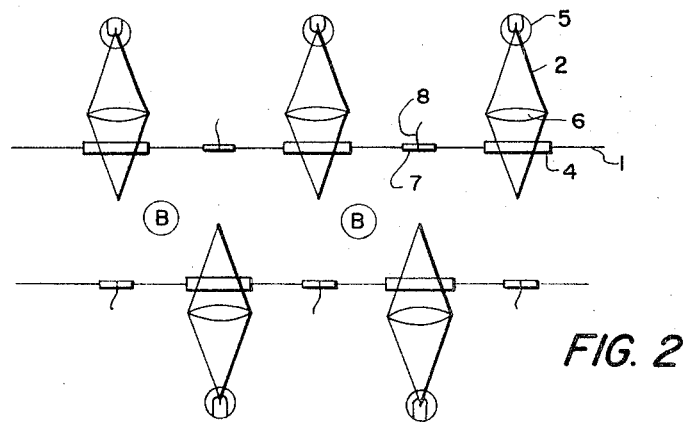
FIGURES 2 and 3 show alternative arrangements for directing photo-ionizing beams into the nozzle of magneto-hydro-dynamic apparatus.
Figure 3:
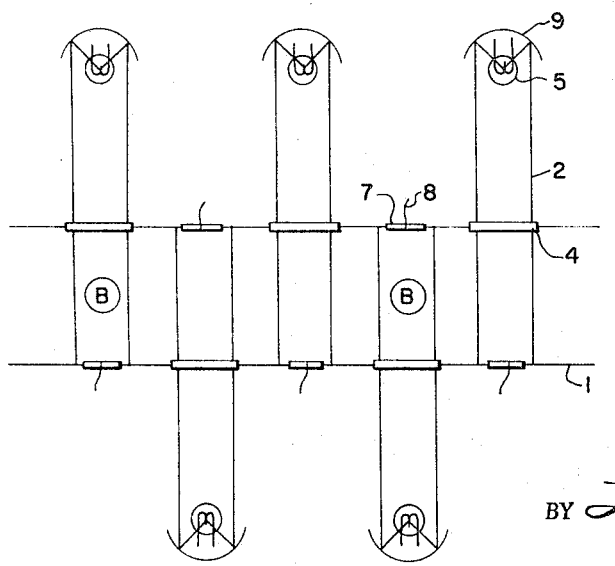

FIGURES 2 and 3 show alternative ways of directing the beams onto the nozzle 1. In FIGURE 2 the nozzle 1 incorporates sapphire or quartz windows 4 through which the photo-ionizing beams 2 are directed into the nozzle. The beams are each derived from a separate source 5 and brought to a focus inside the nozzle by the use of lenses 6 which may also be of quartz. Electrodes and their electrical connections are represented diagrammatically at 7 and 8 respectively.

In FIGURE 3 a beam from each source 5 is collected by a mirror 9 and directed as a parallel beam through sapphire or quartz windows 4.

In both FIGURES 2 and 3 the magnetic field indicated as ⓑ is perpendicular to the plane of the paper.

Figure 4:
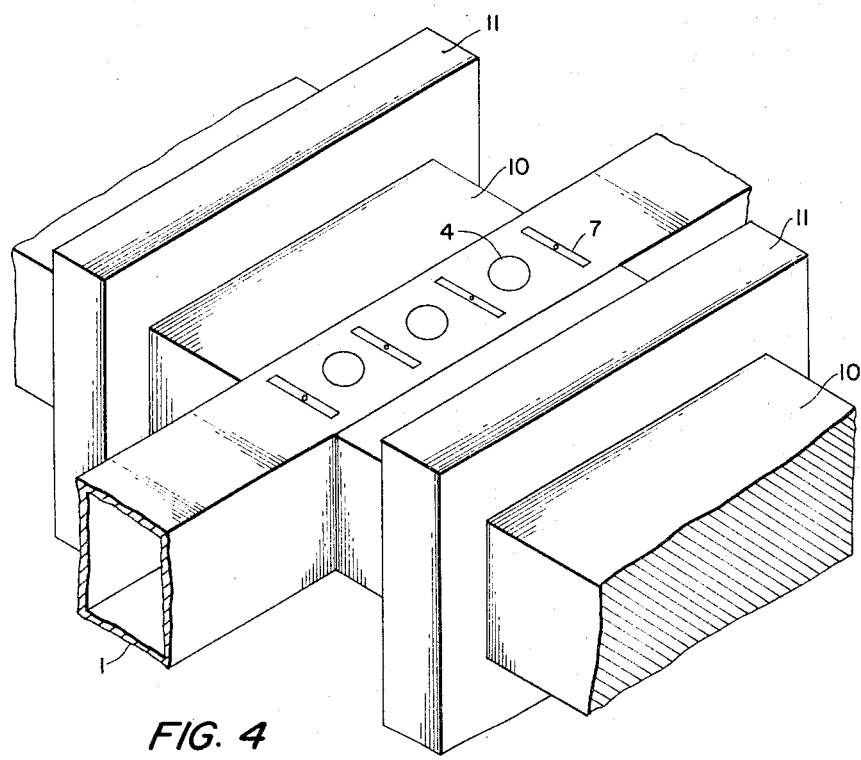
FIGURE 4 is an isometric view of part of a duct of magneto-hydro-dynamic apparatus constructed in accordance with one embodiment of the invention.

Referring to FIGURE 4 apparatus for generating a magnetic field across the duct is shown. The apparatus comprises two pole pieces 10 around which are windings 11 which, when energized, induce a magnetic field in the pole pieces 10 and the field extends across the duct between the pole pieces. The electrical field produced by ionized gas passing through the magnetic field is generated at right angles to the magnetic field and electrodes 7 are arranged above the duct as shown to collect the current generated in a known way with such magneto-hydro-dynamic apparatus. The windows through which the photo-ionizing beams pass into the nozzle can be seen at 4.

Figure 5:
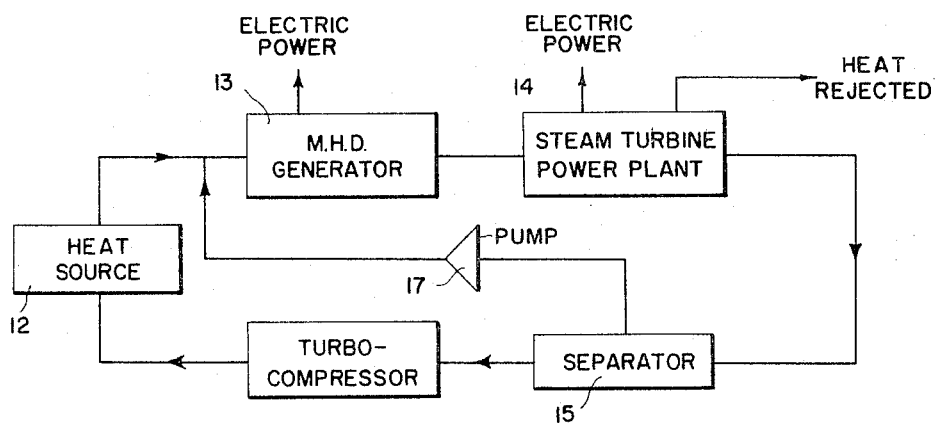
FIGURE 5 is a block diagram showing a typical magneto-hydro-dynamic cycle.

A conventional cycle for magneto-hydro-dynamic apparatus is shown in block form in FIGURE 5.

Heated gas from a suitable source 12 which may for example be a high temperature gas cooled nuclear reactor, passes to a magneto-hydro-dynamic generator 13 which incorporates the nozzle, magnetic field producing apparatus, means for directing the photo-ionizing beam into the nozzle and electrodes for collecting the electrical current generated. Exhaust gas from the nozzle is passed to steam turbine power plant 14 which incorporates a steam boiler heated by the exhaust gas from the nozzle and steam turbine plant consuming steam from the boiler. The steam turbine may be used to generate electricity to supplement that produced by the magneto-hydro-dynamic generator 13.

Gas leaving the boiler of the steam turbine plant passes to a separator 15 where any seeding element added to the gas to increase its ionization potential is separated out. The gas then passes to a turbo-compressor 16 from which it re-enters heat source 1. The seeding element removed from separator 15 is returned to the cycle immediately before the nozzle of the generator 13 by means of electro-magnetic pump 17.

By photo-ionizing the gas in the way described ionization takes place in excess of the equilibrium level for the temperature of the gas. In this way the conductivity of the gas is increased at a given temperature. By combining thermal and photo-ionization techniques the temperature at which the plant needs to be operated to obtain a sufficient level of ionization is reduced.

I claim:
1. Magneto-hydro-dynamic apparatus for the direct generation of electricity comprising:
   a duct through which a thermally ionized gas rapidly is moveable in the direction of the longitudinal axis of said duct;

means to apply a magnetic field transverse to the longitudinal axis of the duct to produce an electric field which is perpendicular to both the direction of motion of said gas and said magnetic field;

a plurality of light means external of said duct to produce radiation which causes photo-ionization of said gas;

a plurality of windows in said duct within said magnetic field disposed to admit said radiations into said duct within the magnetic field to photo-ionize said gas, said windows being arranged on opposite sides of said duct and in staggered relationship along the duct such that windows on opposite sides of the duct are out of alignment; and electrodes on opposite sides of the duct and positioned to accept said electric current induced in said direction perpendicular to both said direction of motion of said gas and said magnetic field.

2. Apparatus according to claim 1 wherein, in the area of said magnetic field, said duct is in the form of a nozzle.

3. Apparatus according to claim 1 wherein the gas includes an ionizable metal vapor and wherein said light radiation has a wavelength shorter than that corresponding to the ionizing potential of said metal.

4. Apparatus according to claim 1 wherein said light means includes means to generate said radiation in pulses.

5. Apparatus according to claim 1 wherein said duct is empty.

6. Apparatus as claimed in claim 1 in which said means for photo-ionizing the gas comprise a laser.

7. Apparatus as claimed in claim 1 in which said means for photo-ionizing the gas comprise mercury arcs.

8. Apparatus as claimed in claim 1 in which said means for photo-ionizing the gas comprise carbon arcs.

9. Apparatus as claimed in claim 1 in which said means for photo-ionizing the gas comprise high pressure plasma jets.

References Cited

UNITED STATES PATENTS

| | | | |
|---|---|---|---|
| 1,443,091 | 1/1923 | Petersen | 310—11 X |
| 2,210,918 | 8/1940 | Karlovitz | 310—11 X |
| 3,149,252 | 9/1964 | Lapp | 310—11 |

OTHER REFERENCES

Periodical: Ionization of Gases by Light, by K. K. Darrow; Bell Systems Technical Journal, vol. 9, 1930, p. 341–355 (P.O.S.L.) or reprint having same pages numbered 1 to 15 respectively (Group 250; Class 313–63).

Periodical: Direct Generation of Elec. Pw. from High Velocity Gas Jet, by D. J. Harris; Elec. Engineering, vol. 80, No. 12, December 1961 (P.O.S.L.) at TK1 A61 (or Gr. 210, Cl. 310–11) pp. 974–978.

DAVID X. SLINEY, *Primary Examiner.*